United States Patent
Murakami et al.

(10) Patent No.: US 9,233,431 B2
(45) Date of Patent: Jan. 12, 2016

(54) ARC WELDING DEVICE AND ARC WELDING SYSTEM

(75) Inventors: Masafumi Murakami, Fukuoka (JP); Takahide Hirayama, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 749 days.

(21) Appl. No.: 13/221,883

(22) Filed: Aug. 30, 2011

(65) Prior Publication Data

US 2012/0080416 A1 Apr. 5, 2012

(30) Foreign Application Priority Data

Oct. 4, 2010 (JP) ................................. 2010-224843

(51) Int. Cl.
*B23K 9/00* (2006.01)
*B23K 9/09* (2006.01)
*B23K 9/095* (2006.01)
*B23K 9/10* (2006.01)

(52) U.S. Cl.
CPC ............. *B23K 9/0953* (2013.01); *B23K 9/1006* (2013.01)

(58) Field of Classification Search
CPC .. B23K 9/0953; B23K 9/1006; B23K 9/0956; B23K 9/1062
USPC ............... 219/130.01, 130.1, 130.21, 130.31, 219/130.32, 130.33, 130.4, 137 PS, 130.5
See application file for complete search history.

(56) References Cited

U.S. PATENT DOCUMENTS

| | | | | |
|---|---|---|---|---|
| 4,553,018 A | * | 11/1985 | Kondo et al. | 219/130.51 |
| 5,281,791 A | * | 1/1994 | Tabata et al. | 219/130.51 |
| 5,824,991 A | * | 10/1998 | Mita et al. | 219/130.51 |
| 6,207,928 B1 | | 3/2001 | Kawamoto et al. | |
| 6,225,597 B1 | * | 5/2001 | Kawamoto et al. | 219/130.51 |
| 6,583,386 B1 | * | 6/2003 | Ivkovich | 219/130.01 |
| 6,627,850 B1 | * | 9/2003 | Koga et al. | 219/137.71 |
| 7,307,240 B2 | * | 12/2007 | Holverson et al. | 219/130.5 |
| 2004/0140301 A1 | * | 7/2004 | Blankenship et al. | 219/130.5 |
| 2005/0090934 A1 | * | 4/2005 | Hirayama et al. | 700/245 |

(Continued)

FOREIGN PATENT DOCUMENTS

CN 85106067 10/1986
CN 1245100 2/2000

(Continued)

OTHER PUBLICATIONS

Information Statement for corresponding JP Application No. 2010-224843, Oct. 2, 2012.

(Continued)

*Primary Examiner* — Dana Ross
*Assistant Examiner* — James Sims, III
(74) *Attorney, Agent, or Firm* — Mori & Ward, LLP (57) ABSTRACT

An arc welding device according to an embodiment carries out welding while repeatedly generating a short circuit state and an arc state between a consumable electrode and a welding member. The arc welding device includes a detection unit and an adjustment unit. The detection unit detects at least one of a length of a short circuit generation period of this time and a length of an arc generation period of this time. The adjustment unit adjusts an increase rate of a short circuit current in a short circuit generation period of next time according to at least one of the length of the short circuit generation period and the length of the arc generation period detected by the detection unit.

12 Claims, 2 Drawing Sheets

(56) References Cited

U.S. PATENT DOCUMENTS

| | | | |
|---|---|---|---|
| 2007/0068910 A1* | 3/2007 | Ikeda et al. | 219/130.01 |
| 2009/0173726 A1* | 7/2009 | Davidson et al. | 219/130.01 |
| 2009/0302014 A1* | 12/2009 | berg | 219/130.51 |
| 2010/0224607 A1* | 9/2010 | Hutchison et al. | 219/130.21 |
| 2012/0074114 A1* | 3/2012 | Kawamoto et al. | 219/130.21 |

FOREIGN PATENT DOCUMENTS

| | | | |
|---|---|---|---|
| CN | 101296773 | 10/2008 | |
| JP | 03-204177 | 9/1991 | |
| JP | 11-277235 | 10/1999 | |
| JP | 4028075 B2 | 10/1999 | |
| JP | 2000-015441 | 1/2000 | |
| JP | 2000-015441 A * | 1/2000 | B23K 9/073 |
| JP | 2004-042100 | 2/2004 | |
| JP | 2006-026655 | 2/2006 | |
| JP | 2009-507646 | 2/2009 | |
| KR | 10-0475516 B1 | 6/1997 | |
| WO | WO 2007/032734 | 3/2007 | |

OTHER PUBLICATIONS

Notification for corresponding JP Application No. 2010-224843, Oct. 16, 2012.

Japanese Decision of a Patent Grant for corresponding JP Application No. 2010-224843, Jul. 24, 2012.

Chinese Office Action for corresponding CN Application No. 201110299622.5, Jul. 24, 2014.

Korean Office Action for corresponding KR Application No. 10-2011-0100175, Oct. 29, 2014.

* cited by examiner

ARC WELDING DEVICE AND ARC WELDING SYSTEM

CROSS-REFERENCE TO RELATED APPLICATION

This application is based upon and claims the benefit of priority from the prior Japanese Patent Application No. 2010-224843, filed on October 4, the entire contents of which are incorporated herein by reference.

FIELD

The embodiments discussed herein are directed to an arc welding device and an arc welding system.

BACKGROUND

Many welding methods for suppressing sputtering and carrying out stable welding have been proposed from the prior art in a gas shield arc welding using a consumable electrode.

In a method for controlling an arc welding device, the length of an arc generation period of one time is detected, an output voltage of a welding power supply in the next arc generation period is reduced proportional to the length of the detected arc generation period, and a welding current in the next arc generation period is increased inversely proportional to the length of the arc generation period of one time in an aim of enhancing the response speed and rapidly recovering the stable welding state is known. A technique described in Japanese Patent Publication No. 4028075 is related to such prior art.

Figure 4:
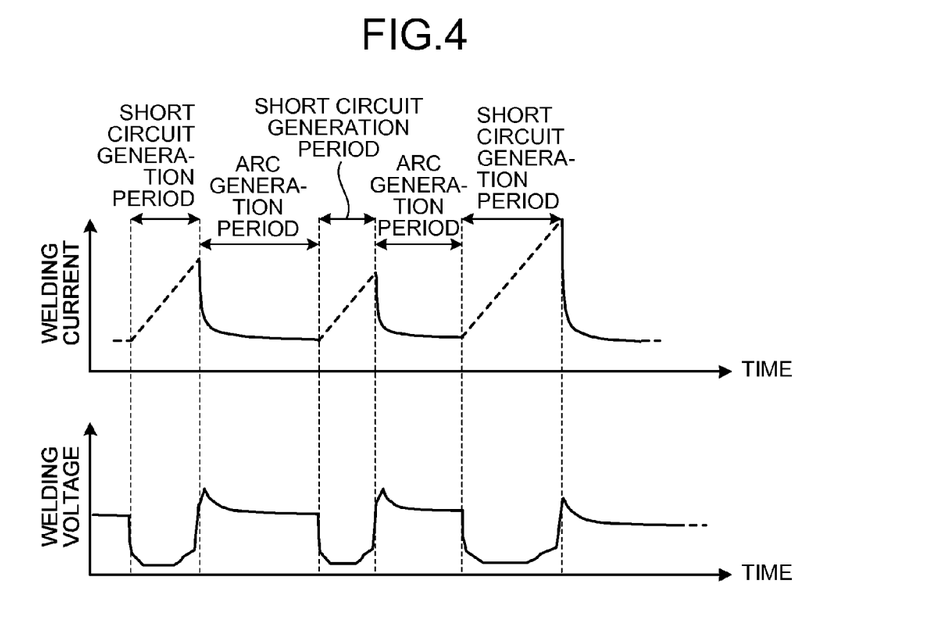
FIG. 4 is a view illustrating waveforms of a welding current and a welding voltage according to a prior art.

In the conventional welding control method, however, the welding current (broken line portion of FIG. 4) for opening the short circuit during the welding often does not have the short circuit current waveform appropriate for the welding state since the increase rate thereof is constant every time, as with the waveforms of the welding current and the welding voltage illustrated in FIG. 4. Thus, the short circuit may not be normally opened and an abnormal short circuit may occur, and the welding may become unstable.

The sputtering may occur greatly by setting the increase rate of the short circuit current to a large value in advance taking into consideration the lack of heat input and the response to when the welding becomes unstable.

SUMMARY

An arc welding device according to an aspect of the embodiment carries out welding while repeatedly generating a short circuit state and an arc state between a consumable electrode and a welding member. The arc welding device includes a detection unit and an adjustment unit. The detection unit detects at least one of a length of a short circuit generation period of this time and a length of an arc generation period of this time. The adjustment unit adjusts an increase rate of a short circuit current in a short circuit generation period of next time according to at least one of the length of the short circuit generation period and the length of the arc generation period detected by the detection unit.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

An arc welding device according to an embodiment carries out welding while repeatedly generating a short circuit state and an arc state between a consumable electrode and a welding member. The arc welding device includes a detection unit and an adjustment unit. The detection unit detects at least one of the length of the short circuit generation period of this time and the length of the arc generation period of this time. The adjustment unit adjusts the increase rate of the short circuit current in the short circuit generation period of next time according to at least one of the length of the short circuit generation period and the length of the arc generation period detected by the detection unit.

Embodiments of the arc welding device and the arc welding system disclosed in the present application will be hereinafter described based on the drawings.

Figure 1:
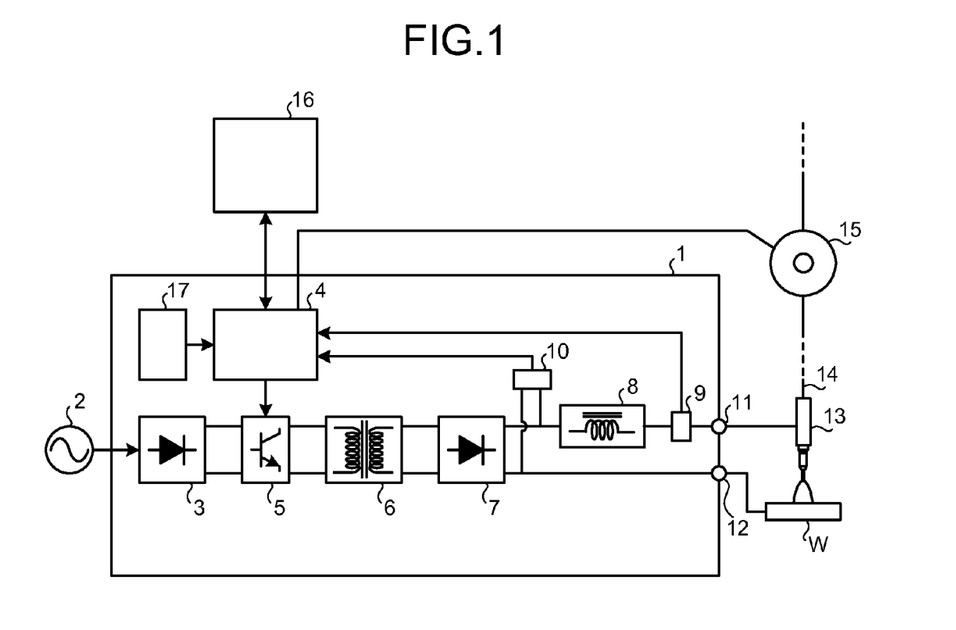
FIG. 1 is a view illustrating a configuration of an arc welding device according to an embodiment.

FIG. 1 is a view illustrating a configuration of an arc welding device according to the embodiment. The power is supplied to an arc welding power supply 1 from an AC (Alternating Current) commercial power supply 2. The commercial power supply 2 is connected to an input side of a primary rectifying circuit 3 in the arc welding power supply 1.

The primary rectifying circuit 3 rectifies the input AC and outputs the same to a switching unit 5. The switching unit 5 performs a PWM control on the output of the primary rectifying circuit 3 so that a welding current command value and a welding voltage command value provided from a welding control unit 4, and the actual welding current value and welding voltage value match. The welding current value is detected by a current detector 9 and the welding voltage value is detected by a voltage detector 10.

The welding control unit 4 controls the welding current value and the welding voltage value upon receiving feedback from the current detector 9 and the voltage detector 10. Furthermore, a supply and feed device 15 for supplying and feeding a welding wire 14 is controlled to supply and feed the welding wire to a work W at a predetermined speed.

The output of the switching unit 5 is connected to a primary side of a main transformer 6, and a secondary side of the main transformer 6 is connected to an input side of a secondary rectifying circuit 7. An output terminal 11 is connected to one output side of the secondary rectifying circuit 7 through a DC reactor 8, and an output terminal 12 is connected to the other output side of the secondary rectifying circuit 7.

One of two output terminals is connected to the welding wire 14 through a welding torch 13, and the other is connected to the work W.

An external controller 16 gives a command to the arc welding power supply 1 and monitors the welding state output from the arc welding power supply 1. When carrying out welding, the external controller 16 gives a command of the welding voltage and the welding current to the arc welding power supply 1. The command of the welding voltage and the welding current given from the external controller 16 to the arc welding power supply 1 is a rough command such as an average of the absolute value of the voltage value and the current value during the welding operation, where the arc welding power supply 1 supplies the welding current and the welding voltage between the welding wire 14 and the work W according to the command from the external controller 16 and appropriately controls the same in units of 1 μs to 1 ms to melt the distal end portion of the welding wire 14 and carry out welding.

The arc welding power supply 1 carries out a constant current control by the welding current command and releases (opens) the short circuit when short circuit occurs, and the arc welding power supply 1 carries out a constant voltage control by the welding voltage command to melt the welding wire when arc occurs, so that control is performed to stably repeat the short circuit state and the arc state.

Various types of parameters for determining the shape of the welding current waveform pattern or the like during welding are stored in a storage unit 17 of the arc welding power supply 1 in advance. The storage unit 17 is specifically configured by a nonvolatile memory, or the like. The waveforms of the welding voltage and the welding current can be variously changed according to the waveform pattern by the process in the switching unit 5.

In FIG. 1, the portion of supplying the shield gas for protecting the arc to the distal end portion of the welding wire is omitted.

In the present embodiment, the length of the short circuit period and the length of the arc period, or the average value of the welding voltage is measured, and the increase rate of the welding current in the next short circuit period is changed according to such value.

In the present embodiment, whether the short circuit generation period or the arc generation period is determined in the welding control unit 4 using the detection value of the voltage detector 10. Specifically, determination is made as the short circuit generation period (short circuit period) if the voltage value is smaller than or equal to a predetermined value, and determination is made as the arc generation period (arc period) if the voltage value is greater than the predetermined value. Such predetermined value can be stored in the storage unit 17 as a parameter. The length of the short circuit period and the length of the arc period of each time can be acquired by starting/stopping the timing by the timer (not illustrated) in the welding control unit 4 every time the short circuit period and the arc period is switched.

The detection value of the voltage detector 10 may be acquired and accumulated for every predetermined sampling time, and the accumulated value may be divided by the sum of the length of the short circuit period and the length of the arc period for one time to acquire the actual average voltage value in one cycle of the short circuit period and the arc period.

Figure 2:
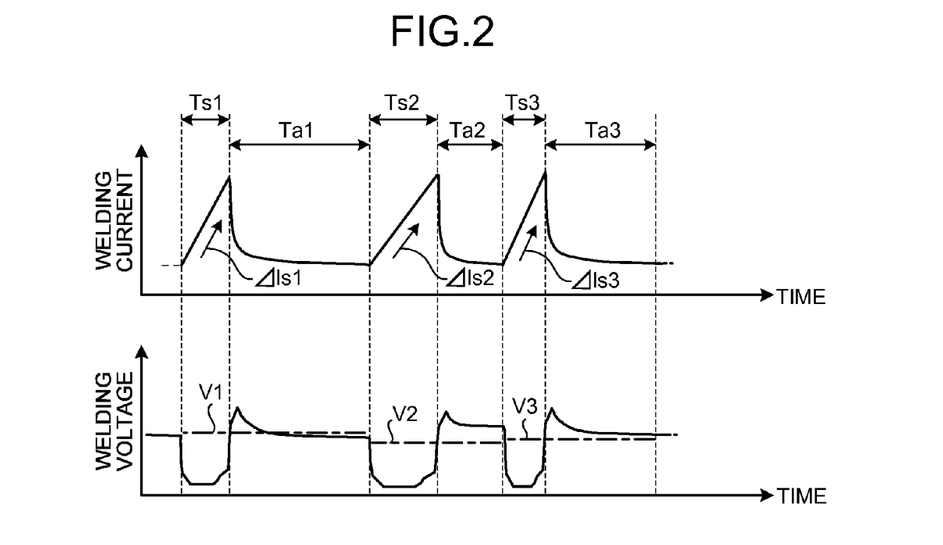
FIG. 2 is a view illustrating waveforms of a welding current and a welding voltage in the arc welding device according to the embodiment.

FIG. 2 is a view illustrating the waveforms of the welding current and the welding voltage in the arc welding device according to the embodiment.

In FIG. 2, Ts1, Ts2, and Ts3 represent the short circuit period and Ta1, Ta2, and Ta3 represent the arc period. As described above, the short circuit state and the arc state are repeated in a short cycle in the units of 1 μs to 1 ms during the welding operation. In FIG. 2, one part of the welding current and the welding voltage in the welding operation is extracted. ΔIs1, ΔIs2, and ΔIs3 represent the increase rate per unit time of the welding current at Ts1, Ts2, and Ts3, respectively. In the present embodiment, command is made to linearly increase the welding current in the short circuit period.

A first embodiment will be described below.

In the first embodiment, the welding control unit 4 outputs a command to the switching unit 5 to measure the length of the short circuit period and to increase the increase rate of the short circuit current in the short circuit period of next time when the short circuit period becomes long. The welding control unit 4 outputs a command to the switching unit 5 to reduce the increase rate of the short circuit current in the short circuit period of next time when the short circuit period becomes short. That is, when the short circuit period becomes long, the amount of heat input to the work becomes small and abnormality short circuit tends to easily occur, and thus this is to be suppressed to stabilize the welding. The welding control unit 4 serves as the detection unit and the adjustment unit.

Taking FIG. 2 by way of example, the increase rate ΔIs2 of the short circuit current in the short circuit period Ts2 changes in cooperation with the length of the short circuit period Ts1, and the increase rate ΔIs3 of the short circuit current in the short circuit period Ts3 changes in cooperation with the length of the short circuit period Ts2.

A specific example of a method for determining the increase rate of the short circuit current will be described.

The minimum value of the increase rate of the short circuit current is defined in advance, and a value obtained by adding a value corresponding to the length of the actual short circuit period to the minimum value is assumed as the increase rate of the short circuit current in the short circuit period of next time.

The increase rate ΔIs of the short circuit current in the short circuit period of next time is determined according to (equation 1), where ΔIs [A/ms] is the increase rate of the short circuit current, ΔIs_min [A/ms] is the minimum value of the increase rate of the short circuit current, and is [ms] is the length of the actual short circuit period.

$$\Delta Is = \Delta Is\_min + (Bs1 \cdot ts) \quad \text{(equation 1)}$$

Here, Bs1 [A/ms²] is the weighting coefficient associated with the length of the short circuit period, and is a positive constant. Appropriate values are determined for ΔIs_min, Bs1 by conducting experiments in advance. ΔIs_min, Bs1 may be stored in the storage unit 17 as parameters, and may be changed as necessary with change in welding conditions. If ΔIs obtained by (equation 1) is too large and is inappropriate, the increase rate of the short circuit current may be assumed as a defined value set in advance.

In another method of determining the increase rate of the short circuit current, a reference value of the increase rate of the short circuit current and a reference value of the short circuit period may be defined in advance, and a value obtained by increasing or decreasing the reference value of the increase rate of the short current by the difference of the reference value of the short circuit period and the length of the actual short circuit period may be assumed as the increase rate of the short circuit current in the short circuit period of next time.

The increase rate ΔIs of the short circuit current in the short circuit period of next time may be determined according to (equation 2), where ΔIs_ref [A/ms] is the reference value of the increase rate of the short circuit current, Ts [ms] is the reference value of the short circuit period, and is [ms] is the length of the actual short circuit period.

$$\Delta Is = \Delta Is\_ref + Bs2 \cdot (ts - Ts) \quad \text{(equation 2)}$$

Here, Bs2 [A/ms²] is the weighting coefficient associated with the length of the short circuit period and is a positive constant, similar to Bs1 of (equation 1). Appropriate values are determined for ΔIs_ref, Bs2, Is by conducting experiments in advance. ΔIs_ref, Bs2, Is may be stored in the storage unit 17 as parameters, and may be changed as necessary with change in welding conditions.

According to (equation 2), ΔIs is a value greater than ΔIs_ref if the length of the actual short circuit period ts is longer than the reference value Ts, and ΔIs is a value smaller than ΔIs_ref if the length of the actual short circuit period ts is shorter than the reference value Ts. In other words, Ts acts like a threshold value on whether to make the increase rate of the short circuit current greater or smaller than the reference value. If ΔIs obtained by (equation 2) is too large or too small and is inappropriate, the increase rate of the short circuit current may be assumed as a defined value set in advance.

As another further method of determining the increase rate of the short circuit current, a plurality of threshold values Ts_th1, Ts_th2, Ts_th3, Ts_th4, . . . (where 0<Ts_th1<Ts_th2<Ts_th3<Ts_th4< . . . ) may be set for the length of the short circuit period, and the increase rate ΔIs of the short circuit current in the short circuit period of next time may be determined according to (equation 3) in accordance with the length ts[ms] of the actual short circuit period, rather than obtaining the increase rate of the short circuit current in a non-step manner as in (equation 1) and (equation 2).

$$\begin{aligned}&\text{In the case of } 0 < ts < \text{Ts\_th1}, \Delta Is = As1\\&\text{In the case of } \text{Ts\_th1} \le ts < \text{Ts\_th2}, \Delta Is = As2\\&\text{In the case of } \text{Ts\_th2} \le ts < \text{Ts\_th3}, \Delta Is = As3\\&\text{In the case of } \text{Ts\_th3} \le ts < \text{Ts\_th4}, \Delta Is = As4\\&\quad(\text{where } 0 < As1 < As2 < As3 < As4)\end{aligned} \quad \text{(equation 3)}$$

Appropriate values are determined for Ts_th1 to Ts_th4, As1 to As4 by conducting experiments in advance. Ts_th1 to Ts_th4, As1 to As4 may be stored in the storage unit 17 as parameters, and may be changed as necessary with change in welding conditions. ΔIs is changed in four stages in (equation 3), but it should be recognized that the number of stages is merely an example.

As described above, as the short circuit period becomes longer, the increase rate of the short circuit current is made larger in the short circuit period of next time and the short circuit is rapidly opened, so that the abnormal short circuit at the time of opening the short circuit is suppressed and the welding is prevented from becoming unstable, and the occurrence of sputtering can be suppressed.

A second embodiment will be described.

The length of the short circuit period is measured, and the increase rate of the short circuit current in the short circuit period of next time is changed according to the length of the short circuit period in the first embodiment, but in the second embodiment, the welding control unit 4 outputs a command to the switching unit 5 to measure the length of the arc period, and to reduce the increase rate of the short circuit current in the short circuit period of next time when the arc period becomes long. The welding control unit 4 outputs a command to the switching unit 5 to increase the increase rate of the short circuit current in the short circuit period of next time when the arc period becomes short. That is, when the arc period becomes short, the amount of heat input to the work becomes small and abnormality short circuit tends to easily occur, and thus this is to be suppressed to stabilize the welding. The welding control unit 4 serves as the detection unit and the adjustment unit.

Taking FIG. 2 by way of example, the increase rate ΔIs2 of the short circuit current in the short circuit period Ts2 changes in cooperation with the length of the arc period Ta1, and the increase rate ΔIs3 of the short circuit current in the short circuit period Ts3 changes in cooperation with the length of the arc period Ta2.

A specific example of a method for determining the increase rate of the short circuit current will be described.

The maximum value of the increase rate of the short circuit current is defined in advance, and a value obtained by subtracting a value corresponding to the length of the actual arc period from the maximum value is assumed as the increase rate of the short circuit current in the short circuit period of next time.

The increase rate ΔIs of the short circuit current in the short circuit period of next time is determined according to (equation 4), where ΔIs [A/ms] is the increase rate of the short circuit current, ΔIs_max [A/ms] is the maximum value of the increase rate of the short circuit current, and ta [ms] is the length of the actual arc period.

$$\Delta Is = \Delta Is\_\max - (Ba1 \cdot ta) \quad \text{(equation 4)}$$

Here, Ba1 [A/ms$^2$] is the weighting coefficient associated with the length of the arc period, and is a positive constant. Appropriate values are determined for ΔIs_max, Ba1 by conducting experiments in advance. ΔIs_max, Ba1 may be stored in the storage unit 17 as parameters, and may be changed as necessary with change in welding conditions. If ΔIs obtained by (equation 4) is too small and is inappropriate, the increase rate of the short circuit current may be assumed as a defined value set in advance.

In another method of determining the increase rate of the short circuit current, a reference value of the increase rate of the short circuit current and a reference value of the arc period may be defined in advance, and a value obtained by increasing or decreasing the reference value of the increase rate of the short current by the difference of the reference value of the arc period and the length of the actual arc period may be assumed as the increase rate of the short circuit current in the short circuit period of next time.

The increase rate ΔIs of the short circuit current in the short circuit period of next time may be determined according to (equation 5), where ΔIs_ref [A/ms] is the reference value of the increase rate of the short circuit current, Ta [ms] is the reference value of the arc period, and ta [ms] is the length of the actual arc period.

$$\Delta Is = \Delta Is\_ref - Ba2 \cdot (ta - Ta) \quad \text{(equation 5)}$$

Here, Ba2 [A/ms$^2$] is the weighting coefficient associated with the length of the arc period and is a positive constant, similar to Ba1 of (equation 4). Appropriate values are determined for ΔIs_ref, Ba2, Ta by conducting experiments in advance. ΔIs_ref, Ba2, Ta may be stored in the storage unit 17 as parameters, and may be changed as necessary with change in welding conditions.

According to (equation 5), ΔIs is a value smaller than ΔIs_ref if the length of the actual arc period ta is longer than the reference value Ta, and ΔIs is a value greater than ΔIs_ref if the length of the actual arc period ta is shorter than the reference value Ta. In other words, Ta acts like a threshold value on whether to make the increase rate of the short circuit current greater or smaller than the reference value. If ΔIs obtained by (equation 5) is too small or too large and is inappropriate, the increase rate of the short circuit current may be assumed as a defined value set in advance.

As another further method of determining the increase rate of the short circuit current, a plurality of threshold values Ta_th1, Ta_th2, Ta_th3, Ta_th4, . . . (where 0<Ta_th1<Ta_th2<Ta_th3<Ta_th4< . . . ) may be set for the length of the arc period, and the increase rate ΔIs of the short circuit current in the short circuit period of next time may be determined according to (equation 6) in accordance with the length ta[ms] of the actual arc period, rather than obtaining the increase rate of the short circuit current in a non-step manner as in (equation 4) and (equation 5).

$$\left.\begin{array}{l}\text{In the case of } 0 < ta < \text{Ta\_th1}, \Delta Is = Aa1 \\ \text{In the case of Ta\_th1} \le ta < \text{Ta\_th2}, \Delta Is = Aa2 \\ \text{In the case of Ta\_th2} \le ta < \text{Ta\_th3}, \Delta Is = Aa3 \\ \text{In the case of Ta\_th3} \le ta < \text{Ta\_th4}, \Delta Is = Aa4 \\ \text{(where } Aa1 > Aa2 > Aa3 > Aa4 > 0)\end{array}\right\} \quad \text{(equation 6)}$$

Appropriate values are determined for Ta_th1 to Ta_th4, Aa1 to Aa4 by conducting experiments in advance. Ta_th1 to Ta_th4, Aa1 to Aa4 may be stored in the storage unit 17 as parameters, and may be changed as necessary with change in welding conditions. ΔIs is changed in four stages in (equation 6), but it should be recognized that the number of stages is merely an example.

As described above, as the arc period becomes shorter, the increase rate of the short circuit current is made larger in the short circuit period of next time and the short circuit is rapidly opened, so that the abnormal short circuit at the time of opening the short circuit is suppressed and the welding is prevented from becoming unstable, and the occurrence of sputtering can be suppressed.

A third embodiment will now be described.

In the first embodiment and the second embodiment, the length of the short circuit period and the length of the arc period are measured, and the increase rate of the short circuit current in the short circuit period of next time is changed according to the respective length, but in the third embodiment, the welding control unit 4 measures an average welding voltage value in the short circuit period and the arc period, and outputs a command to the switching unit 5 to reduce the increase rate of the short circuit current in the short circuit period of next time when the average voltage value becomes large. When the average welding voltage value in the short circuit period and the arc period becomes small, on the other hand, the welding control unit 4 outputs a command to the switching unit 5 to increase the increase rate of the short circuit current in the short circuit period of next time. That is, when the average voltage value becomes small, the amount of heat input to the work becomes small and abnormality short circuit tends to easily occur, and thus this is to be suppressed to stabilize the welding. The welding control unit 4 serves as the detection unit and the adjustment unit.

Taking FIG. 2 by way of example, the increase rate ΔIs2 of the short circuit current in the short circuit period Ts2 changes in cooperation with the average welding voltage value V1 in the short circuit period Ts1 and the arc period Ta1, and the increase rate ΔIs3 of the short circuit current in the short circuit period Ts3 changes in cooperation with the average welding voltage value V2 of the short circuit period Ts2 and the arc period Ta2.

In FIG. 2, the average welding voltage values V1, V2, V3 are indicated with a horizontal line segment illustrated with a chain dashed line.

A specific example of a method for determining the increase rate of the short circuit current will be described.

The maximum value of the increase rate of the short circuit current is defined in advance, and a value obtained by subtracting a value corresponding to the average welding voltage value in the actual short circuit period and the arc period from the maximum value is assumed as the increase rate of the short circuit current in the short circuit period of next time.

The increase rate ΔIs of the short circuit current in the short circuit period of next time is determined according to (equation 7), where ΔIs [A/ms] is the increase rate of the short circuit current, ΔIs_max [A/ms] is the maximum value of the increase rate of the short circuit current, and va [V] is the average welding voltage value in the actual short circuit period and the arc period.

$$\Delta Is = \Delta Is\_\max - (Bv1 \cdot va) \quad \text{(equation 7)}$$

Here, Bv1 [A/(ms·V)] is the weighting coefficient associated with the length of the short circuit period, and is a positive constant. Appropriate values are determined for ΔIs_max, Bv1 by conducting experiments in advance. ΔIs_max, Bv1 may be stored in the storage unit 17 as parameters, and may be changed as necessary with change in welding conditions. If ΔIs obtained by (equation 7) is too small and is inappropriate, the increase rate of the short circuit current may be assumed as a defined value set in advance.

In another method of determining the increase rate of the short circuit current, a reference value of the increase rate of the short circuit current and a reference value of the average welding voltage value in the short circuit period and the arc period may be defined in advance, and a value obtained by increasing or decreasing the reference value of the increase rate of the short circuit current by the difference of the reference value of the average welding voltage value and the actual average welding voltage value may be assumed as the increase rate of the short circuit current in the short circuit period of next time.

The increase rate ΔIs of the short circuit current in the short circuit period of next time may be determined according to (equation 8), where ΔIs_ref [A/ms] is the reference value of the increase rate of the short circuit current, Va [V] is the reference value of the average welding voltage value, and va [V] is the average welding voltage value in the actual short circuit period and the arc period.

$$\Delta Is = \Delta Is\_ref - Bv2 \cdot (va - Va) \quad \text{(equation 8)}$$

Here, Bv2 [A/(ms·V)] is the weighting coefficient associated with the average welding voltage value and is a positive constant, similar to Bv1 of (equation 7). Appropriate values are determined for ΔIs_ref, Bv2 by conducting experiments in advance. ΔIs_ref, Bv2 may be stored in the storage unit 17 as parameters, and may be changed as necessary with change in welding conditions.

According to (equation 8), ΔIs is a value smaller than ΔIs_ref if the actual average welding voltage value va is greater than the reference value Va, and ΔIs is a value greater than ΔIs_ref if the actual average welding voltage value va is smaller than the reference value Va. In other words, Va acts like a threshold value on whether to make the increase rate of the short circuit current greater or smaller than the reference value. If ΔIs obtained by (equation 8) is too small or too large and is inappropriate, the increase rate of the short circuit current may be assumed as a defined value set in advance.

As another further method of determining the increase rate of the short circuit current, a plurality of threshold values Vth1, Vth2, Vth3, Vth4, . . . (where 0<Vth1<Vth2<Vth3<Vth4< . . . ) may be set for the average welding voltage value, and the increase rate ΔIs of the short circuit current in the short circuit period of next time may be determined according to (equation 9) in accordance with the actual average welding voltage value va[V], rather than obtaining the increase rate of the short circuit current in a non-step manner as in (equation 7) and (equation 8).

$$\left.\begin{array}{l}\text{In the case of } 0 < va < Vth1, \Delta Is = Av1 \\ \text{In the case of } Vth1 \le va < Vth2, \Delta Is = Av2 \\ \text{In the case of } Vth2 \le va < Vth3, \Delta Is = Av3 \\ \text{In the case of } Vth3 \le ta < Vth4, \Delta Is = Av4 \\ \text{(where } Av1 > Av2 > Av3 > Av4 > 0)\end{array}\right\} \quad \text{(equation 9)}$$

Appropriate values are determined for Vth1 to Vth4, Av1 to Av4 by conducting experiments in advance. Vth1 to Vth4, Av1 to Av4 may be stored in the storage unit 17 as parameters, and may be changed as necessary with change in welding conditions. ΔIs is changed in four stages in (equation 9), but it should be recognized that the number of stages is merely an example.

As described above, as the average voltage value becomes smaller, the increase rate of the short circuit current is made larger in the short circuit period of next time and the short circuit is rapidly opened, so that the abnormal short circuit at the time of opening the short circuit is suppressed and the welding is prevented from becoming unstable, and the occurrence of sputtering can be suppressed.

A fourth embodiment will now be described.

Figure 3:
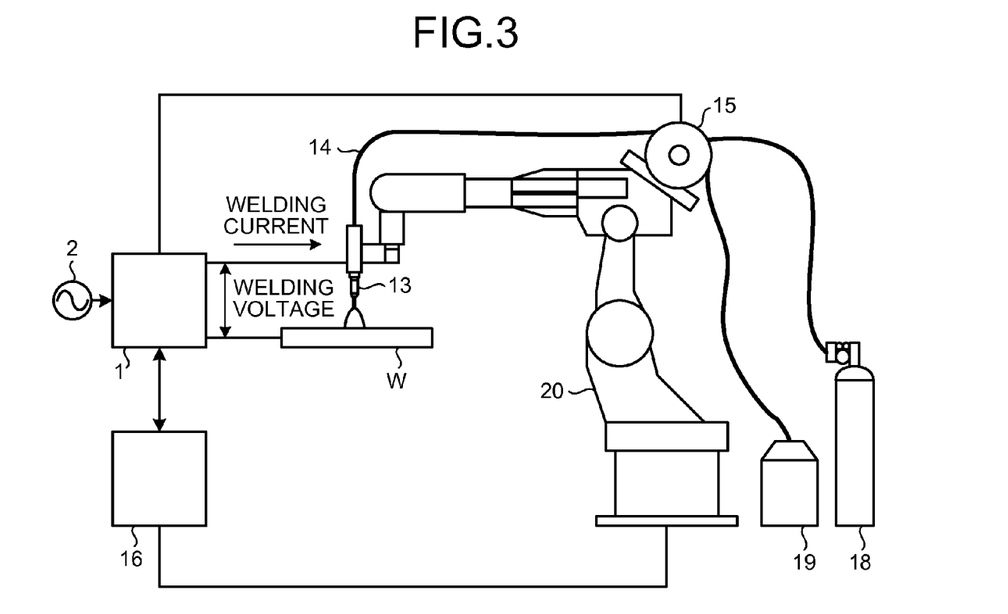
FIG. 3 is a view illustrating a configuration of an arc welding system according to the embodiment.

FIG. 3 is a view illustrating a configuration of an arc welding system according to the embodiment. In FIG. 3, an arc welding system in which the arc welding device described in the first embodiment to the third embodiment is combined with a robot 20 having a welding torch 13 attached at the distal end is illustrated.

A feeding device 15 is mounted on the robot 20, so that a welding wire 14 incorporated in a welding wire supply section 19 is fed to the welding torch 13 at the distal end portion of the robot.

The external controller 16 in FIG. 1 functions as a robot controller in FIG. 3. In other words, the robot 20 is controlled to variously change the position and the orientation of the welding torch 13 at the distal end portion, so that the tip of the welding torch 13 can carry out welding while being moved to draw a desired welding line with respect to the work W. A command related to welding is given to the arc welding power supply 1, or the welding state is monitored.

Although omitted in FIG. 1, the shield gas is supplied from a gas cylinder 18 to the welding torch 13 in FIG. 13.

According to the arc welding system as illustrated in FIG. 3, the increase rate of the short circuit current in the short circuit period of next time is fluctuated according to the length of the short circuit period, the length of the arc period, or the average value of the welding voltage values in the short circuit period and the arc period to prevent the welding from becoming unstable and suppress the occurrence of sputtering.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An arc welding device to carry out welding while repeatedly generating a short circuit state and an arc state between a consumable electrode and a welding member, the arc welding device comprising:
a storage unit that stores a predetermined parameter;
a detection unit configured to detect a length of a current short circuit generation period;
an adjustment unit programmed to adjust an increase rate of a short circuit current in a next short circuit generation period in accordance with the length of the current short circuit generation period detected by the detection unit and the predetermined parameter stored in the storage unit; and
a switching unit that controls a welding current,
wherein the adjustment unit is programmed to output to the switching unit a command that adjusts the increase rate of the short circuit current in the next short circuit generation period in accordance with the length of the current short circuit generation period detected by the detection unit and the predetermined parameter stored in the storage unit, and
wherein the switching unit controls the welding current based on the command outputted by the adjustment unit.

2. The arc welding device according to claim 1, wherein the adjustment unit increases the increase rate of the short circuit current in the next short circuit generation period as the length of the short circuit generation period detected by the detection unit becomes larger, and reduces the increase rate of the short circuit current in the next short circuit generation period as the length of the short circuit generation period detected by the detection unit becomes smaller.

3. The arc welding device according to claim 1, wherein the adjustment unit increases the increase rate of the short circuit current in the next short circuit generation period if the length of the short circuit generation period detected by the detection unit is greater than a predetermined threshold value, and reduces the increase rate of the short circuit current in the next short circuit generation period if the length of the short circuit generation period detected by the detection unit is smaller than the predetermined threshold value.

4. An arc welding device to carry out welding while repeatedly generating a short circuit state and an arc state between a consumable electrode and a welding member, the arc welding device comprising:
a storage unit that stores a predetermined parameter;
a detection unit that detects a length of a current arc generation period;
an adjustment unit programmed to adjust an increase rate of a short circuit current in a next short circuit generation period in accordance with the length of the current arc generation period detected by the detection unit and the predetermined parameter stored in the storage unit; and
a switching unit that controls a welding current,
wherein the adjustment unit is programmed to output to the switching unit a command that adjusts the increase rate of the short circuit current in the next short circuit generation period in accordance with the length of the current arc generation period detected by the detection unit and the predetermined parameter stored in the storage unit, and
wherein the switching unit controls the welding current based on the command outputted by the adjustment unit.

5. The arc welding device according to claim 4, wherein the adjustment unit reduces the increase rate of the short circuit current in the next short circuit generation period as the length of the arc generation period detected by the detection unit becomes larger, and increases the increase rate of the short circuit current in the next short circuit generation period as the length of the arc generation period detected by the detection unit becomes smaller.

6. The arc welding device according to claim 4, wherein the adjustment unit reduces the increase rate of the short circuit current in the next short circuit generation period if the length of the arc generation period detected by the detection unit is greater than a predetermined threshold value, and increases the increase rate of the short circuit current in the next short circuit generation period if the length of the arc generation period detected by the detection unit is smaller than the predetermined threshold value.

7. An arc welding device for carrying out welding while repeatedly generating a short circuit state and an arc state between a consumable electrode and a welding member, the arc welding device comprising:
   a storage unit that stores a predetermined parameter;
   a detection unit that obtains an average value of welding voltages in a current short circuit generation period and a current arc generation period;
   an adjustment unit programmed to adjust an increase rate of a short circuit current in a next short circuit generation period in accordance with the average value of the welding voltages detected by the detection unit and the predetermined parameter stored in the storage unit; and
   a switching unit that controls a welding current,
   wherein the adjustment unit is programmed to output to the switching unit a command that adjusts the increase rate of the short circuit current in the next short circuit generation period in accordance with the average value of the welding voltages detected by the detection unit and the predetermined parameter stored in the storage unit, and
   wherein the switching unit controls the welding current based on the command outputted by the adjustment unit.

8. The arc welding device according to claim 7, wherein the adjustment unit reduces the increase rate of the short circuit current in the next short circuit generation period as the average value of the welding voltages becomes greater, and increases the increase rate of the short circuit current in the next short circuit generation period as the average value of the welding voltages becomes smaller.

9. The arc welding device according to claim 7, wherein the adjustment unit reduces the increase rate of the short circuit current in the next short circuit generation period if the average value of the welding voltages is greater than a predetermined threshold value, and increases the increase rate of the short circuit current in the next short circuit generation period if the average value of the welding voltages is smaller than the predetermined threshold value.

10. An arc welding system comprising:
    an arc welding device to carry out welding while repeatedly generating a short circuit state and an arc state between a consumable electrode and a welding member; and
    a robot for relatively moving a distal end portion of the consumable electrode with respect to the welding member, wherein
    the arc welding device includes:
        a storage unit that stores a predetermined parameter;
        a detection unit that detects a length of a current short circuit generation period;
        an adjustment unit programmed to adjust an increase rate of a short circuit current in a next short circuit generation period in accordance with the length of the current short circuit generation period detected by the detection unit and the predetermined parameter stored in the storage unit; and
        a switching unit configured to control a welding current,
    wherein the adjustment unit is programmed to output to the switching unit a command that increases the increase rate of the short circuit current in the next short circuit generation period as the length of the current short circuit generation period detected by the detection unit becomes larger, and reduces the increase rate of the short circuit current in the next short circuit generation period as the length of the current short circuit generation period detected by the detection unit becomes smaller, and
    wherein the switching unit controls the welding current based on the command outputted by the adjustment unit.

11. An arc welding system comprising:
    an arc welding device that carries out welding while repeatedly generating a short circuit state and an arc state between a consumable electrode and a welding member; and
    a robot that relatively moves a distal end portion of the consumable electrode with respect to the welding member, wherein
    the arc welding device includes:
        a storage unit that stores a predetermined parameter;
        a detection unit configured to detect a length of a current arc generation period;
        an adjustment unit programmed to adjust an increase rate of a short circuit current in a next short circuit generation period in accordance with the length of the current arc generation period detected by the detection unit and the predetermined parameter stored in the storage unit; and
        a switching unit that controls a welding current,
    wherein the adjustment unit is programmed to output to the switching unit a command that reduces the increase rate of the short circuit current in the next short circuit generation period as the length of the current are generation period detected by the detection unit becomes larger, and increases the increase rate of the short circuit current in the next short circuit generation period as the length of the current arc generation period detected by the detection unit becomes smaller, and
    wherein the switching unit controls the welding current based on the command outputted by the adjustment unit.

12. An arc welding system comprising:
    an arc welding device that carries out welding while repeatedly generating a short circuit state and an arc state between a consumable electrode and a welding member; and
    a robot that relatively moves a distal end portion of the consumable electrode with respect to the welding member, wherein
    the arc welding device includes:
        a storage unit that stores a predetermined parameter;
        a detection unit configured to obtain an average value of welding voltages in a current short circuit generation period and a current arc generation period;
        an adjustment unit programmed to adjust an increase rate of a short circuit current in a next short circuit generation period in accordance with the average value of the welding voltages detected by the detection unit and the predetermined parameter stored in the storage unit; and
        a switching unit that controls a welding current, wherein the adjustment unit is programmed to output to the switching unit a command that reduces the increase rate of the short circuit current in the next short circuit generation period as the average value of the welding voltages detected by the detection unit becomes larger, and increases the increase rate of the short circuit current in the next short circuit generation period as the average value of the welding voltages detected by the detection unit becomes smaller, and wherein the switching unit controls the welding current based on the command outputted by the adjustment unit.

* * * * *